United States Patent [19]

Shibano

[11] Patent Number: 4,866,785

[45] Date of Patent: Sep. 12, 1989

[54] MULTI-VALVED IMAGE PROCESSING APPARATUS AND METHOD

[75] Inventor: Kohji Shibano, Kawasaki, Japan

[73] Assignee: International Business Machines Corporation, Armonk, N.Y.

[21] Appl. No.: 212,033

[22] Filed: Jun. 23, 1988

Related U.S. Application Data

[63] Continuation of Ser. No. 945,066, Dec. 19, 1986, abandoned.

[30] Foreign Application Priority Data

Dec. 27, 1985 [JP] Japan .................................. 60-293403

[51] Int. Cl.$^4$ ............................................... G06K 9/00
[52] U.S. Cl. ......................................... 382/49; 382/51; 382/54
[58] Field of Search ..................... 382/8, 49, 51, 54, 55

[56] References Cited

U.S. PATENT DOCUMENTS

| | | | |
|---|---|---|---|
| 4,003,024 | 1/1977 | Riganti et al. | 382/49 |
| 4,322,716 | 3/1982 | Sternberg | 382/49 |
| 4,414,685 | 11/1983 | Sternberg | 382/49 |
| 4,441,207 | 4/1984 | Lougheed et al. | 382/8 |
| 4,510,616 | 4/1985 | Lougheed et al. | 382/49 |
| 4,541,116 | 9/1985 | Lougheed | 382/49 |
| 4,646,355 | 2/1987 | Petrick et al. | 382/49 |

Primary Examiner—Leo H. Boudreau
Attorney, Agent, or Firm—Terry J. Ilardi

[57] ABSTRACT

Apparatus and method for processing multi-valved images includes an erosion filter and a dilation filter. The erosion filter determines the frequency with which a pixel having the same value as a pixel at a first check position of a first window appears in the first window. If the frequency of appearance is equal to or less than a value predetermined for the pixel value of the first check position, the pixel value at the first check position is made null. This operation is recursively executed while scanning a multi-valved image with the first window. The dilation filter replaces any null pixel value at a second check position of a second window with a selected non-null pixel value in the second window. The selected non-null value has the maximum frequency of appearance in the second window. This operation is also recursively executed while scanning the multi-valved image with the second window.

2 Claims, 14 Drawing Sheets

| P(i−1,j−1) | P(i−1,j) | P(i−1,j+1) |
|---|---|---|
| P(i,j−1) | P(i,j) | P(i,j+1) |
| P(i+1,j−1) | P(i+1,j) | P(i+1,j+1) |

MULTI-VALVED IMAGE PROCESSING APPARATUS AND METHOD

This application is a continuation of application Ser. No. 945,066, filed 12/19/86, now abandoned.

DESCRIPTION

1. Field of the Invention

The present invention relates to an apparatus and method for processing a multi-valued image, and more particularly relates to a method and apparatus based on a mathematical morphology newly extended for a multi-valued image.

2. Description of the Prior Art

In image processing based on conventional mathematical morphology, for example, as shown in "Image Analysis and Mathematical Morphology," Academic Press, London, 1982, erosion and dilation filters are defined for a binary image of (0, 1), where one of 0 and 1 is regarded as null, and a gray scale image that is considered to have continuous values. These filters are used for image processing with specific consideration made for spatial structures. A device for performing the image processing is disclosed in a patent application by Jan Serra (Japanese Published Examined Patent Application 52-23537). With reference to the above book, the erosion and dilation filters of the conventional mathematical morphology are described below.

Erosion filtering for a binary image in the conventional mathematical morphology is defined as follows. Consider a window W, also referred to as a structure element, consisting of an image of (0,1), and a binary image I to be processed. In the erosion filtering, the binary image I is scanned with the window W, and the pixel value of I at the center of W is replaced with 0, or null other than when all portions of 1 in W is included in portions of 1 in I. In other words, during the scan of the image with the structure element, hit/miss operations between 1's of the structure element and 1's of the image are performed.

In contrast with the mathematical morphology applied to a binary image, which is the process based on the overlap between the structure element and the sub-image of 1's in the concerned image, the extended erosion filter for a gray scale image transforms the pixel value of the concerned image at the center of a structure element, which is also a gray scale image, into the minimum difference between the values of the pixels in the structure element and the values of the corresponding pixels in the concerned image, during the scan of the concerned image with the structure element. The extended dilation filter transforms the pixel value of the concerned image at the center of the structure into the maximum sum therebetween.

Such an image analysis technique by the conventional mathematical morphology is used for feature extraction and measurement of spatial structures of binary and gray scale images. However, several problems occur when extending the applied field of this technique. The first one is in how to extend it to the gray scale. Although a spatial position of a pixel in an image and the pixel value are of different dimensions, the mathematical morphology for binary images has been extended to one for gray scale images by regarding the pixel value as a Z coordinate to (X, Y) coordinates that indicate the spatial position. Also, there is a limitation in handling in a binary image because only a case where there is noise in an original image is considered.

Typical conventional technologies and their problems for the above mentioned fields of utilization are described below.

(1) Image restoration and noise reduction

The primary conventional technique considers a set of simple binary values as an image model, and considers only Markovness as an additional constraint to the image model because of the Markov random field (for example, see Derin et al., "Bayes Smoothing Algorithm for Segmentation of Binary Images Modeled by Random Markov Fields", *IEEE Transaction on Pattern Analysis and Machine Intelligence,* Vol. PAM 1-6, Nov., 1984, pp. 707-757. Geman et al., "Stochastic Relaxation, Gibbs Distribution, and the Bayesian Restoration of Images", IEEE Transaction on Pattern Analysis and Machine Intelligence, Vol. PAM 1-6, Nov., 1984, pp. 721-741, Dunn et al, "Local Estimation of the Uniform Error Threshold," IEEE Transaction on Pattern Analysis and Machine Intelligence, Vol. PAM 1-6, November, 1984, pp. 742-747. Image restoration by the Markov random field requires convergent calculation and necessitates much calculation.

Relative to document image restoration using an image model similar to the present invention, there is a work by Minou and Sakai for a binary image. Minou and Sakai, "Classification of the Image Quality and Noise Removal Method for Bi-level Line Drawings, *Transactions of Information Processing Society of Japan,* Vol. 21, No. 2, March 1983, pp. 182-190. They propose a restoration technique of a document image by a MOLD (Mesh Oriented Line Drawing) model. In the MOLD model, it is proposed to prepare combinations of eight neighborhoods of $3 \times 3$, which meet conditions or are legal, and to restore an image through checking of the image based on those combinations. In the legal pattern matching process, it is impossible to extend to the multi-valued image processing.

An image restoration process using a smoothing filter (a moving average or mode filter) based on the eight neighborhood is unstable because the model, which is a premise of the process, is vague. For example, in the mode filter, on one occasion a certain value becomes the output of the filter even if the frequency of the appearance of the value is 2, and on another occasion the value doesn't become the output even if the frequency is 4.

(2) Automatic generalization of a map

There are two main processes in existing automatic map generalization. In the prior conventional method, a vector map is first generated from an image map, and then simplification is performed based on the vector map (for example, refer to IBM Journal of Research & Development, Vol. 26, No, 6, pp. 715-723). This method is not effective if the image is complicated, and does not match existing standards for mapping.

In another known method continuous regions having a larger number of pixels than a predetermined value are left (Remote Sensing of Environment). Such method has two problems:, (1) it does not match the mapping standard as in the method based on the vector map, and (2) it is complex.

Also, there is a method using a smoothing filter, the problems of which are as described above.

(3) Simplification for image pattern recognition

There are many approaches using spatial relations in the image recognition. These approaches are also called texture analysis, and various methods are known. The major prior technique is to use spatial statistics, for example, an average value in a window. In this method, however, digital data indicative of spectral information of objects is processed with attention to only neighborhood relation, or irrespective of the objects, and fails to sufficiently reflect the size of the objects in the recognition process as an independent element.

(4) Simplification of an image

When an image is displayed on an image display, there arise two problems of intelligibility and deterioration of display brightness if the image to be displayed is too complicated. Therefore, it is required to simplify the image in accordance with the resolution of display and the display work environment so as to improve the display work environment.

(5) Stabilization of reduction process on a digital copier

While use of digital process copiers is increasing the results may become unstable by performing only a simple reduction process. Namely, simple thinning out of, for example, ruled lines, results in only ruled lines remaining, or conversely no ruled lines remaining.

Therefore, it is necessary to preprocess an image to allow stable weighting for each pixel value.

(6) Preprocess for data compression

A scanner is affected by various noises in the course of scanning. This noise can cause significant deterioration of data compression efficiency. Noise reduction and restoration of an image, and in particular to process office documents including printed material is needed.

The present invention provides a basic configuration for image operations supported by the mathematical morphology extended naturally for a multi-valued image.

It is thus an object of the present invention to provide a method and apparatus for processing multi-valued images that works well when applied to a case where it is possible or required to take an image model, in which (a) objects in an image have a predetermined size (a structure element of a minimum unit) or a larger one, and (b) values of pixels, pixel values, are the same in the minimum unit as long as no noise is added to the pixel.

It is another object of the invention to provide a multi-valued image processing method and apparatus which can be used for (1) restoration or noise reduction of printed material or a document image, (2) automatic generalization of a map satisfying mapping standards (for example, the specifications on land use maps prescribed by the Geographical Survey Institute) from an image map such as a land use map or land cover map obtained from resource survey satellite images, (3) simplification of an image for pattern recognition, (4) simplification of an image for improving intelligibility or preventing deterioration of brightness on an image display, (5) a preprocess for stabilizing reduction in a digital copier, and (6) a preprocess for compressing data in image communication.

It is yet another object to provide a basic configuration for performing image operations supported by the mathematical morphology extended naturally for a multi-valued image.

It is a still further object of the invention to provide a method for reducing noise and restoring an image by taking noise into account based on the mathematical morphology.

These and other objects, advantages and features of the invention will be more apparent upon reference to the attached drawings and following specification.

SUMMARY OF THE INVENTION

The multi-valued image processing apparatus according to the present invention comprises an erosion filter and a dilation filter. The erosion filter determines the frequency with which a pixel having the same value as a pixel at a first check position of a first window appears in the first window. If the frequency of appearance is equal to or less than a value predetermined for the pixel value of the first check position, the pixel value at the first check position is made null. This operation is recursively executed while scanning a multi-valued image with the first window. The dilation filter replaces any null pixel value at a second check position of a second window with a certain non-null pixel value in the second window. The certain non-null value has the maximum frequency of appearance in the second window. This operation is also recursively executed while scanning the multi-valued image with the second window.

BRIEF DESCRIPTION OF THE DRAWINGS

FIGS. 5–13 are diagrams for illustrating operation of the noise reduction and restoration unit 5 of FIG. 1.

DETAILED DESCRIPTION OF THE PREFERRED EMBODIMENTS

Figure 1:
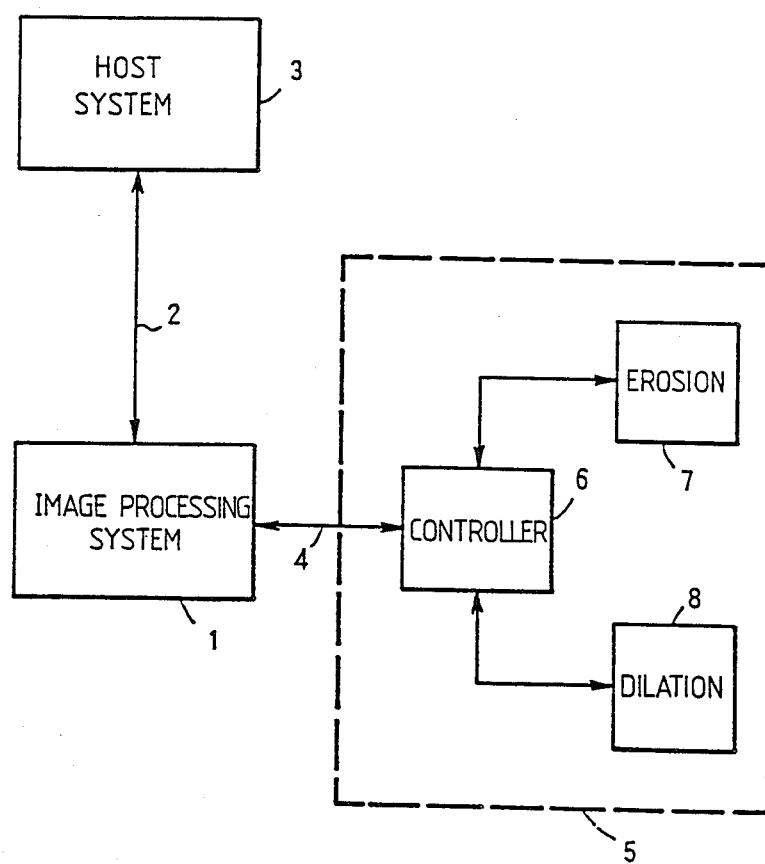
FIG. 1 is a block diagram schematically showing one embodiment of the invention.

The operation of the erosion filter and the dilation filter are mathematically described as follows.

The multi-valued image I is considered to be a set of images Ik that correspond to pixel values of k respectively, and that have k and null values as their pixel values. That is, it can be expressed as:

$$I = U \; k \; I \; k, \text{ where } I \; k = \{(p, k) | v(p) = k\}.$$

p is any coordinate position while v (p) is the pixel value of the coordinate position p.

Now, a structure element S and translate of S are defined as follows. That is, it is assumed that S is any (null, 1) image, and the structure is defined by the portions of 1. Translate Sp of the structure element S by p is defined as follows:

$$S\;p = \{a + p | a \; \epsilon S\}$$

This translate operation element enables ones to mathematically define a window scanning an image.

It is possible to define the erosion filter and the dilation filter extended for the multi-valued image and based on majority logic as follows. The extended erosion process of the image I by the structure element S can be defined as:

$$I \ominus S = \{(p, k) | |Ik \cap S p| > tk, \text{ where } v(p) = k\}$$

Here, $|Ik \cap S p|$ represents the number of pixels in the common area of a partial image Ik of the image I, the pixel value of which is k, and the structure element S. This definition may be implemented using the following process during the scanning of the image I with the structure element S as the window: storing the pixel value of the center position of the window if the number of appearance of the same pixel values as the center position of the window is tk or more, and otherwise changing it to the null value, that is, deleting it.

The extended dilation process for the image I with the structure element S is defined as:

$$I \oplus S = \{(p, k) | \max k |Ik \cap S p|\}$$

That is, it is a process of replacing the pixel value of the center position of the window with the non-null pixel value in the window, which has the maximum pixel number in the window.

The multi-valued image processing method according to the present invention performs the noise reduction and the image restoration for the above image model by utilizing the above-mentioned multi-valued image processing apparatus.

In other words, the multi-valued image processing method according to the present invention first reconstructs an image only with pixel values dominant in the window. In the above image model, the pixel values are the same in the structure element of a minimum unit, and, if they are not same, it is assumed that noise is added to the image, so that it is considered that the reconstruction reduces noise. The reconstruction can be executed by replacing the pixel values which are not locally dominant with null pixel values using the erosion filter of the above-mentioned multi-valued image processing apparatus, and then by replacing the null pixel values with pixel values that are locally dominant, using the dilation filter of the abovementioned multi-valued image processing apparatus.

More particularly, the frequency that a pixel having the same pixel value as the pixel at a first check position of the erosion filter appears is first determined. The window consists of the structure element of the predetermined minimum unit. Then the pixel value at the first check position is changed to null, when the frequency is less than a threshold value predetermined for the pixel value at the first check position. Each threshold is predetermined as smaller than 100% of the number of all pixels in the erosion filter window. This operation is recursively executed while scanning the multi-valued image once with the erosion filter window.

Since the threshold can be set for each pixel value, it is possible to weight the pixel value.

Then, if the pixel value at a second check position of a first dilation filter window is null, the pixel value at the second check position is replaced with a non-null pixel value in the first dilation filter window having a frequency of appearance of that is not zero, and is the maximum. This operation is recursively executed while repeating the scanning with the first dilation filter window so that null pixels are substantially eliminated from the multi-valued image.

In the multi-valued image processing method according to the present invention, next, smaller regions than the structure element of the minimum unit are removed, and then the image is reconstructed with same pixel value regions larger than the predetermined size. Since, in the above image model, the objects contained in the image are larger than the predetermined size (the structure element of the minimum unit,, such reconstruction can be performed. This enables simplification of the image. The reconstruction can be executed by making the same pixel regions less than a predetermined size, have null, values using the erosion filter means of the above-mentioned multi-valued image processing apparatus, and then by replacing the null pixels with non-null pixel values in the neighborhood using the dilation filter means of the above-mentioned multi-valued image processing apparatus.

More particularly, a pixel at the first check position is made null when one or more pixels differ in pixel values from the pixel at the first check position in the window for the erosion filter. This operation is recursively executed while scanning the multi-valued image once with the window for erosion filter.

Then, when a pixel value at a third check position of a second dilation filter window is null, that pixel value is replaced with a pixel in the second erosion filter window the pixel value of which is not null, the frequency of appearance of which is not zero, and is the maximum. This operation is recursively executed while repeating scanning with the second erosion filter window so that null pixel values are substantially eliminated from the multi-valued image.

In the multi-valued image processing method of the present invention, the filter size of the erosion filter means is equal to the size of structure element of the minimum unit not only where an image is reconstructed with same color regions having the minimum size or larger, but also where an image is reconstructed with locally dominant pixel values. In the above image model, the region specified by the dominant pixel values can be considered to be essentially identical with the region of an object. This is because the former can be considered to be the latter added with noise. Therefore, the erosion filter means having the size of the structure element of the minimum unit is used also when an image is reconstructed with the locally dominant pixel values.

In addition, it is possible to make the size of both the erosion filter means and the dilation filter means in each step the same as the size of the structure element of the minimum unit. The size of the erosion filter means may be incremented each time as the scanning of the image is repeated.

Now, description is made by referring to the drawings of an embodiment where the invention is applied to a system that automatically generalizes a map from satellite images. The map is such as a land use map colored for various categories such as forest and barren land.

Prior to detailed description of the embodiment, points to be noted in generalization of a map colored for each category are explained by exemplifying the land use map of Japan.

Relative to the land use map in Japan, rules are specified by the 25,000 : 1 Land Use Map Mapping Specifications, and the 25,000 : 1 Land Use Survey Work Regulations of the Geographical Survey Institute, the Ministry of Construction. Article 5, General of the Mapping Specifications prescribes selection and general representation of items to be represented on a land use map.

This prescription is summarized as follows: the minimum area unit on the map is 1.00 mm; and if a same land use classification occupies 50%/70% or more of the minimum area unit, the classification is regarded to cover all the unit. The minimum area unit and the ratio of mixture are prescribed for each land use classification in the detailed regulations.

In automatically generalizing such a land use map, intermediate images are obtained by correcting images sent from a satellite and they are considered to consist of a completed land use map and noise added thereto. Then, the noise reduction and image restoration process according to the present invention is applied to the intermediate images to obtain the image of land use map. If the minimum unit and the mixing ratio vary from category to category, the size and threshold of the filter are established accordingly.

Now, FIG. 1 shows the embodiment as a whole, wherein an image processing system 1 is connected to a host system 3 through a channel 2. The image processing system 1 may be, for example, an image processing system 7350 manufactured by International Business Machines Corporation. The image processing system 1 is connected with a noise reduction/image restoration unit 5 through a line 4 (for example, a system bus of the image processing system 1). The noise reduction/image restoration unit 5 consists of a controller 6, an erosion filter 7, and a dilation filter 8.

Figure 2:
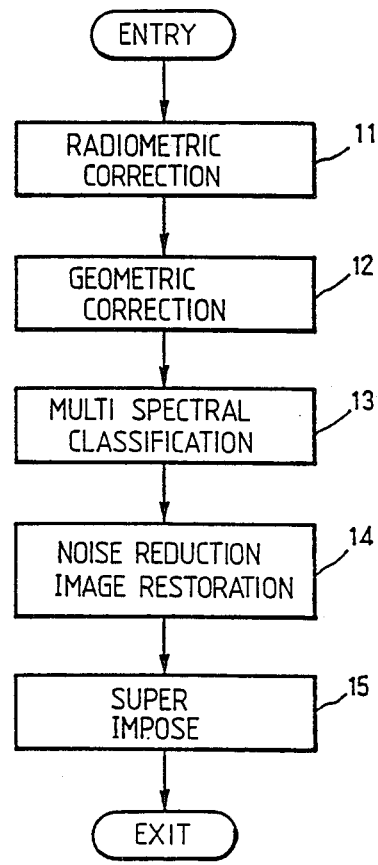
FIG. 2 is a flowchart showing the process performed in the embodiment of FIG. 1.

FIG. 2 shows a process for automatically generalizing a land use map. As shown in Figure 2, images obtained from a satellite such as Landsat are first subject to radiation correction (step 11). This correction includes calibration that is based on correction values on the ground, and relative correction that resolves difference between several sensors. Then, geometric correction is conducted (step 12) followed by supervised maximum likelihood multispectral classification (step 13). Step 14 for noise reduction and restoration that is then conducted relates to the subject of the present invention, details of which are described later. After the step 14, superimposition is performed for roads, railways, administrative districts, and the like (step 15). Steps 11-13, and 15 are executed by resources of the host system 3 or the image processing system 1. Step 14 is executed by the noise reduction/image restoration unit 5.

Figure 3:
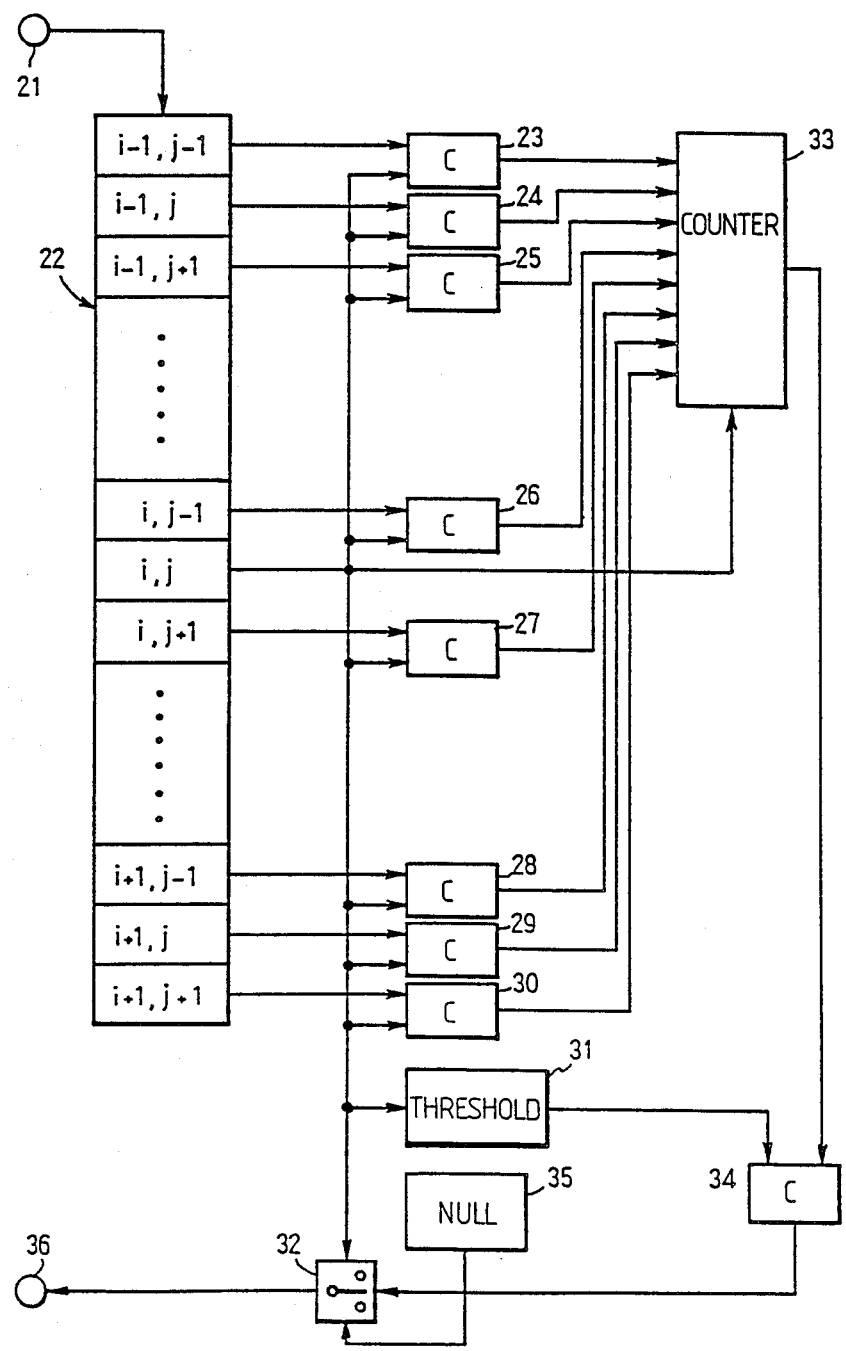
FIG. 3 is a block diagram showing illustration of the erosion filter 6 of FIG. 1.

FIG. 3 shows the erosion filter 7 of the noise reduction/image restoration unit 5. In FIG. 3, an input 21 of the erosion filter is supplied with image data stored in the host system 3 or image processing system 1. The image data is, for example, color codes representing the images, as sequentially sent out in the order of arrows (1), (2), (3) in FIG. 5. The image data is supplied to a line buffer 22, and sequentially fed through a series of stages. Stages of $(i-1, j-1)$, $(i-1, j)$, $(i-1, j+1)$, $(i, j-1)$, $(i, j\ 1)$, $(i+1, j-1)$, $(i+1, j)$ and $(i+1, j+1)$ of the line buffer 22 are connected to first inputs of comparators 23, 24, 25, 26, 27, 28, 29, and 30 respectively, while a stage $(i, j)$ is connected to second inputs of the comparators 23-30, and also to a threshold generator 31. The stage $(i, j)$ is also connected to first switching terminal of a switch 32. Outputs of the comparators 23-30 are connected to a counter 33, the output of which is connected to a first input of a comparator 34. A second input of the comparator 34 is connected to an output of the threshold generator 31, while output of the comparator 34 is connected to a control input of the switch 32. A second switching terminal of switch 32 is connected to an output of a null signal generator 35, while an output of the switch 32 is connected to an output 36 of the erosion filter.

In such configuration, the stages $(i-1, j-1)$, $(i-1, j)$, $(i-1, j+1)$, $(i, j-1)$, $(i, j)$, $(i, j+1)$, $(i+1, j-1)$, $(i+1, j)$ and $(i+1, j+1)$ of the line buffer 22 correspond to a window (W in FIG. 5) consisting of nine pixels of 3 rows ×3 columns. That is, the stages $(i1, j-1) \ldots (i+1, j+1)$ are stored with pixel data p $(i-1, j-1) \ldots p(i+1, j+1)$ shown in FIG. 6, respectively, which are supplied to the corresponding comparators 23-30. Because the image data is sequentially transferred through the line buffer 22, the pixel data inputted into the comparators 23-30 changes sequentially. For example, it is such that the pixel data inputted into the comparators 23-30 at a certain time are defined by W in FIG. 5, while those inputted into the comparators 23-30 at predetermined time delayed from that time are defined by W'.

Although here the window consists of 3 rows ×3 columns, or a center pixel and eight neighbor pixels for the convenience of description, the window should have a round shape of 1 mm or 2 mm for actual generalization of a land use map. Furthermore, in actuality, there will be more comparators 23-30 then these shown and they will receive pixel data sent out from stages other than those shown, so that the size of the window can be varied in accordance with the value of the center pixel p $(i, j)$. The description on this point is eliminated because it can be appropriately designed by those skilled in the art.

Figures 5, 6:
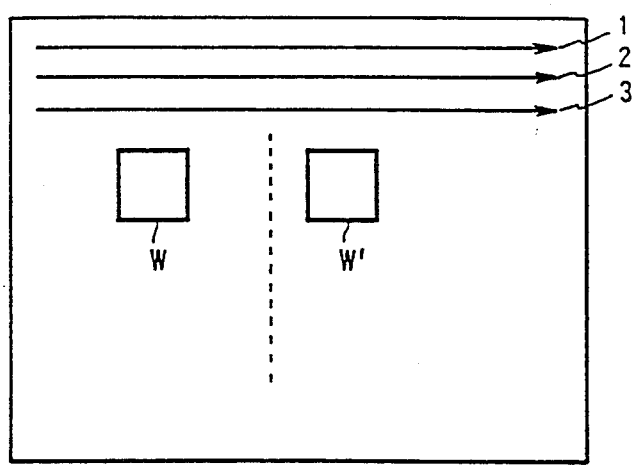

The comparators 23-30 compare the pixel values p $(i-1, j-1)$, p $(i-1, j)$, p $(i-1, j+1)$, p $(i, j-1)$, p $(i+1, j-1)$, p $(i, j+1)$, p $(i+1, j)$, and p $(i+1, j+1)$ of eight neighborhoods in FIG. 6 with the center pixel value of p $(i, j)$, respectively. The counter 33 consists of a combination circuit, and generates a counter output indicating the number of coincidence outputs. On the other hand, the threshold generator 31 receives the center pixel value p $(i, j)$, and outputs a threshold corresponding to it. In case of creation of the land use map, the threshold is determined to be a range of 50% to 70% (in majority logic filtering to be described later), or 100% (in minimum area filtering to be described later) for each pixel value according to the above-mentioned description. The number of coincidence outputs is compared with the threshold 31 in the comparator 34. If the number of coincidence outputs is equal to or larger than the threshold, the switch 32 switches to the first switching terminal to output the center pixel value p $(i, j)$ from the output 36. On the other hand, if the number of coincidence outputs is less than the threshold, the switch 32 switches to the second switching terminal to output a null signal from the unit output 36.

Figure 7:
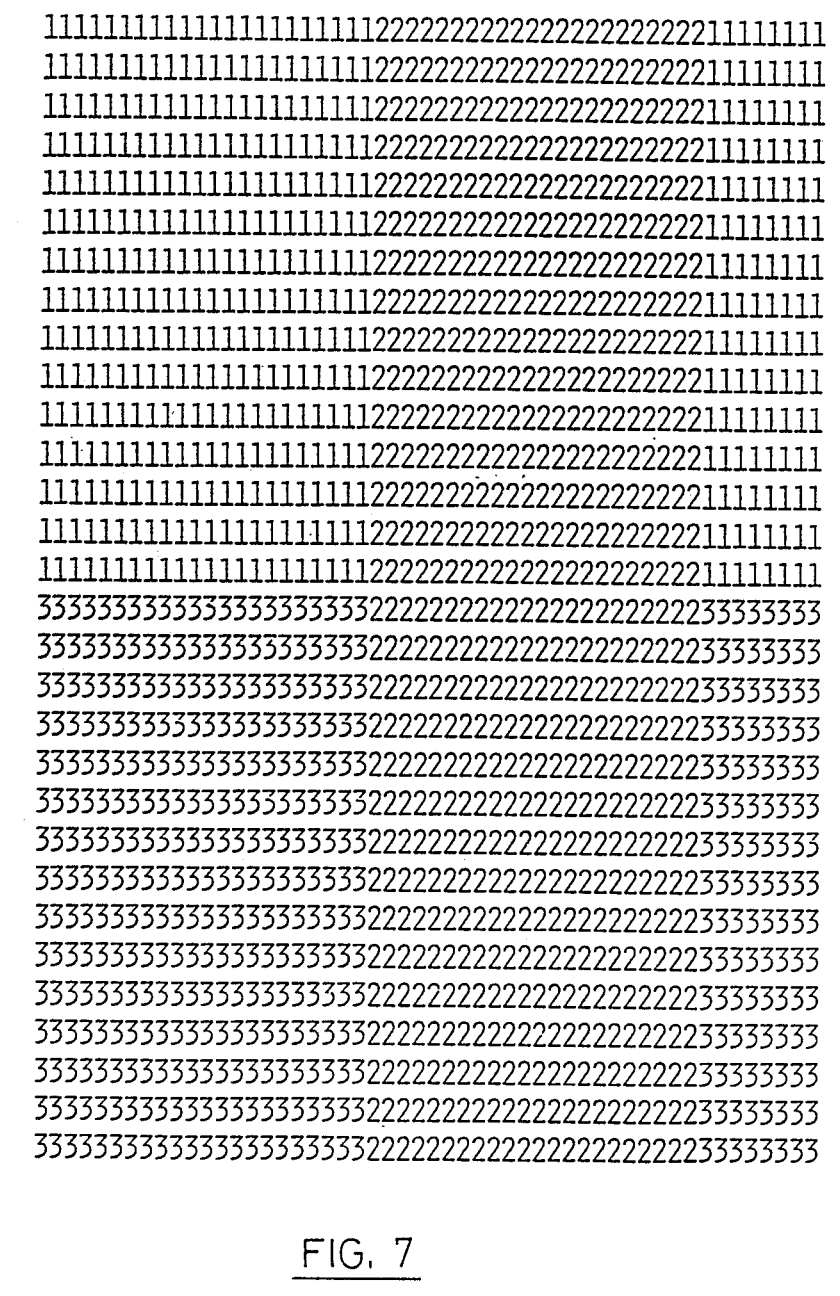
Figure 8:
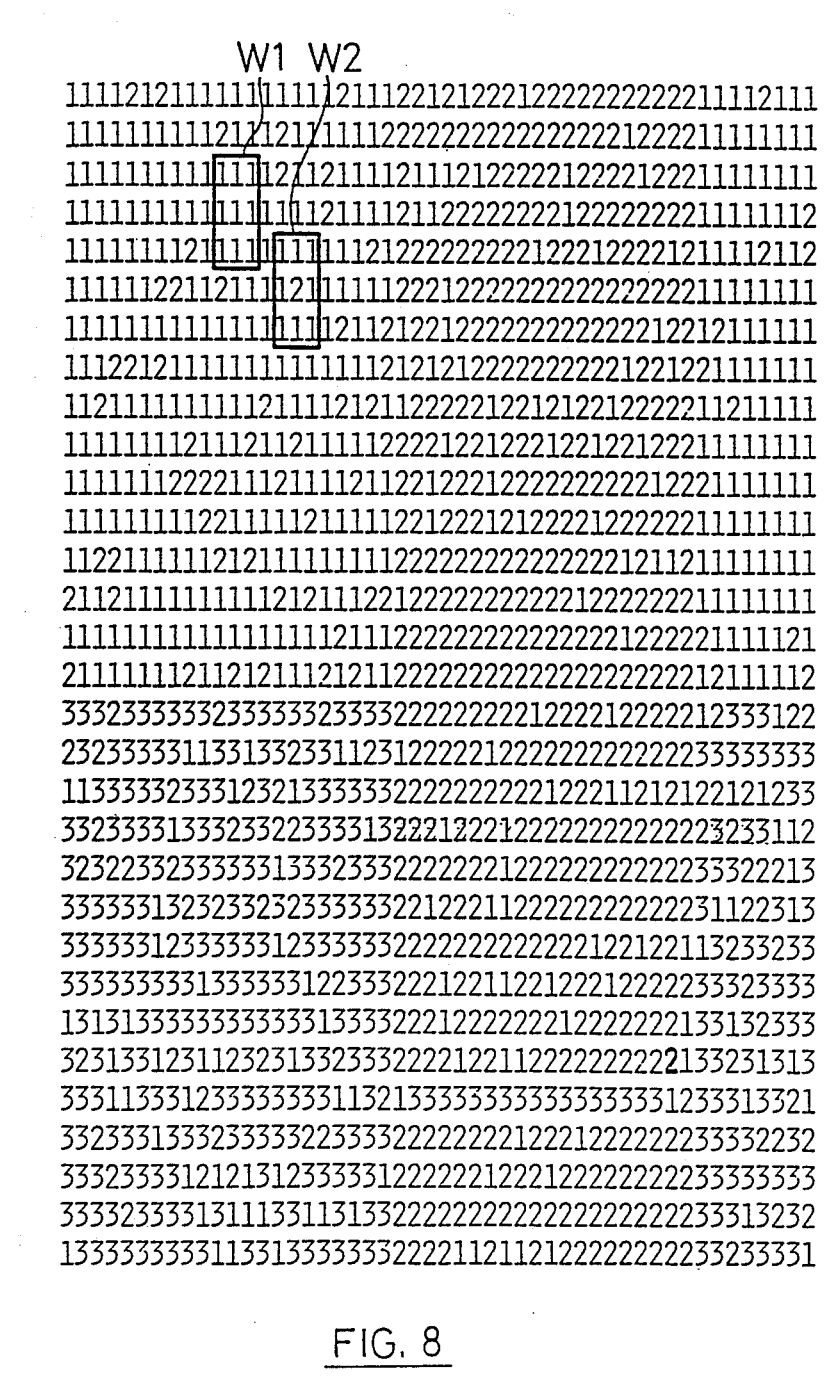

Now, the operation of this configuration is described referring to one example. FIG. 7 shows a part of a final target image. An image to be processed by the dilation filter 7 to generate FIG. 7 is shown in FIG. 8, which consists of the image of Figure 7 and noise randomly added at a rate of ⅓. The threshold is 50%, or 4 for the example of eight neighborhoods. 1, 2, and 3 in these and the following figures indicate color codes.

A window W 1 of FIG. 8 has the center pixel value of 1, and the pixel value for eight neighborhoods is also 1. Since 8>4 (threshold), the center pixel value is outputted from the output 36 as it is. A pixel value of 1 is left at a corresponding position in FIG. 9.

Another window 2 of FIG. 8 has the center pixel value of 2, and the pixel value for eight neighborhoods is 1. Since 0<4 (threshold), the center pixel value is replaced by a null value. This is shown in FIG. 9.

Figure 9:
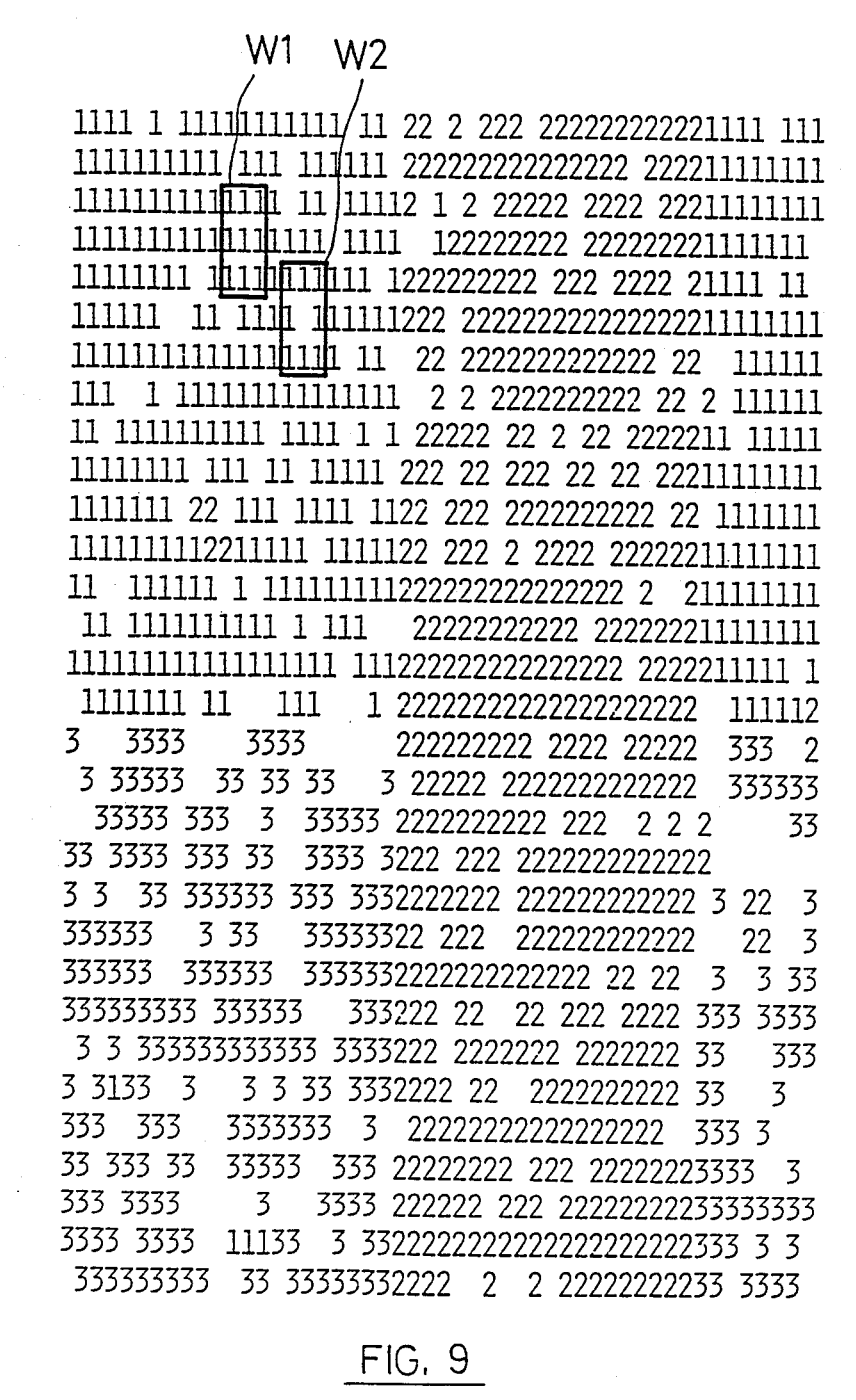

Such an operation is performed for each pixel in the image, and provides the image of FIG. 9 as the result.

Figure 4:
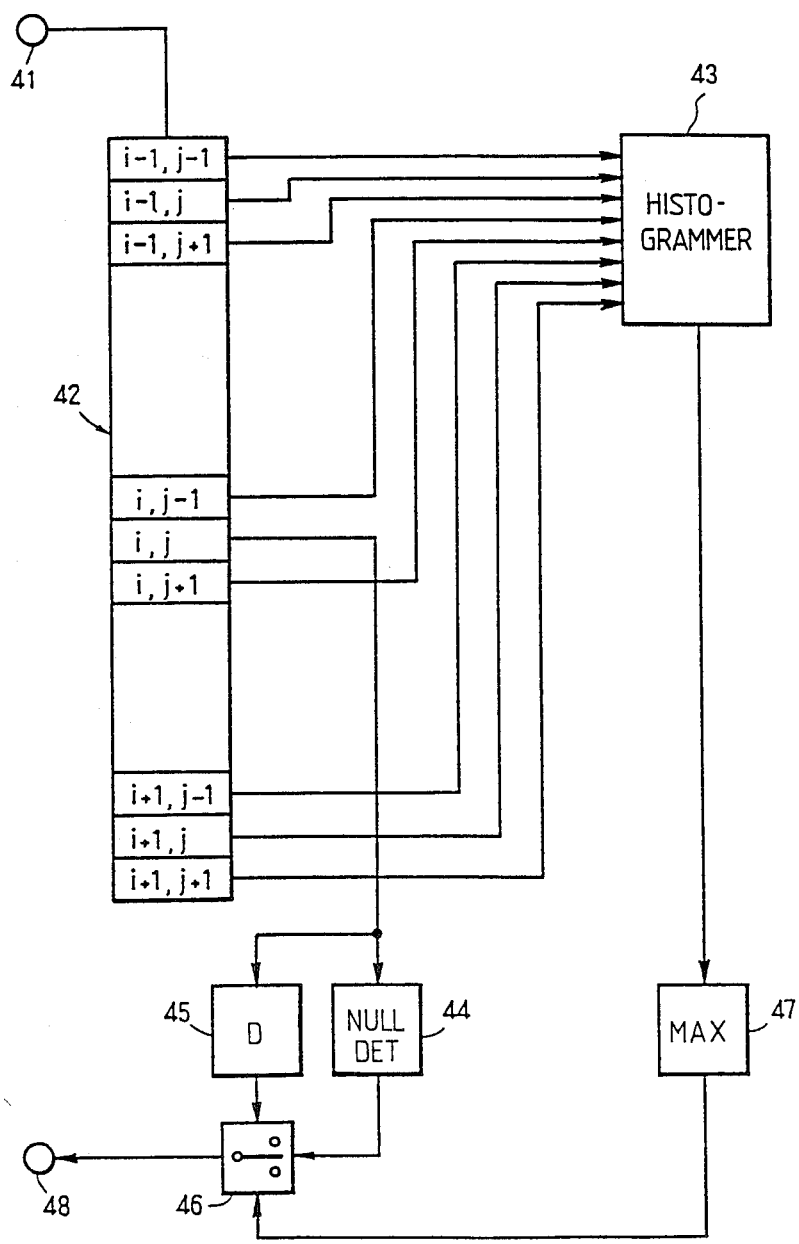
FIG. 4 is a block diagram showing details of the dilation filter 7 of FIG. 1.

Now, description is made on the configuration of the dilation filter 8 of the noise reduction/image restoration unit 5 of FIG. 1. In FIG. 4, an input 41 of the dilation filter is supplied with image data in the same manner that it is supplied to the input 21 of the erosion filter of FIG. 3. The input 41 is connected with a line buffer 42, and image data in stages (i−1, j−1), (i−1, j), (i−1, j+1), (i, j−1), (i, j+1), (i+1, j−1), (i+1, j), and (i+1, j+1) of the line buffer 42 is supplied to a histogrammer 43. A stage (i, j) is supplied to a null signal detector 44, and also to a first switching terminal of a switch 46 through a delay circuit 45. The delay circuit 45 offsets the delay caused when data passes through the histogrammer 43 and a maximum value detector 47. Output of the histogrammer 43 is supplied to the maximum value detector 47. A pixel value having the maximum frequency is outputted from the maximum value detector 47, and supplied to a second switching terminal of the switch 46. Output of the null signal detector 44 is supplied to a control input of the switch 46. When the null signal detector 44 detects a null signal, switch 46 turns to output 48 of the dilation filter. On the other hand, if the null signal detector 44 does not detect a null signal, switch 46 turns to the first switching terminal, and the center pixel value is outputted from the output 48.

For example, since, in FIG. 9 mentioned above, the center pixel value of the window W 1 is 1 (non-null), 1 is outputted from the output 48 as it is. On the other hand, in the window W 2, the center pixel is null, and all eight neighborhood pixels are 1. Therefore, the pixel with the maximum value is 1, and 1 is outputted from the output 48. If all pixels in the window are null, a null signal is outputted from the output 48. In the dilation filter 8, null pixels may still remain only by scanning the image once, or by supplying the image to the dilation filter 8 once and processing it. In such case, the process is repeated several times.

Figure 13:
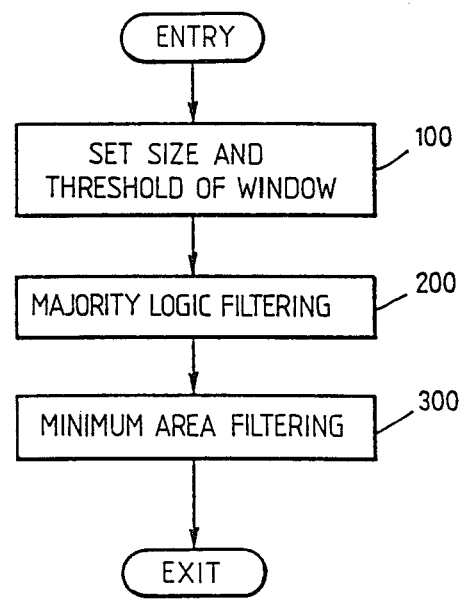

Now, a flow of operation that is executed in the noise reduction/image restoration unit 5 of the embodiment is described in accordance with FIG. 13. While some of individual operations are already described, they are described in duplicate for the convenience of description.

(1) Establishment of the size and the threshold of the window (step 100)

The size and the threshold of the window are established for each pixel value, or the land use category corresponding to it. The establishment is performed through the entry device of image processing system 1, or by an application program on the host system 3. The controller 6 of the noise reduction/image restoration unit 5 controls the erosion filter 7 and the dilation filter 8 based on the data established in such manner.

It is a matter of course that the above establishment is performed in accordance with the regulations of land use maps.

(2) Majority logic filtering (step 200)

Erosion filter 7 processes an image according to the size and the threshold of the window established in step 100. For example, an image added with noise as shown in FIG. 8 is processed by the window size of 3 rows ×3 columns and the threshold of 50%. Then, an image as shown in FIG. 9 is obtained. In this image pixels not dominant in the window are already changed to null, and therefore the noise portion is made null. Then, the process is performed by the dilation filter 8 with the size of the window remaining as before. It has already been described that this process is repeated several times to eliminate null portions from the image. The size of the filter may be incremented during the repetition. This enables the elimination of null pixels with fewer repetitions. If the null portions still remain after a predetermined number of repetitions, supplemental processing may be performed by using the output of the mode filter on the original image.

Figure 10:
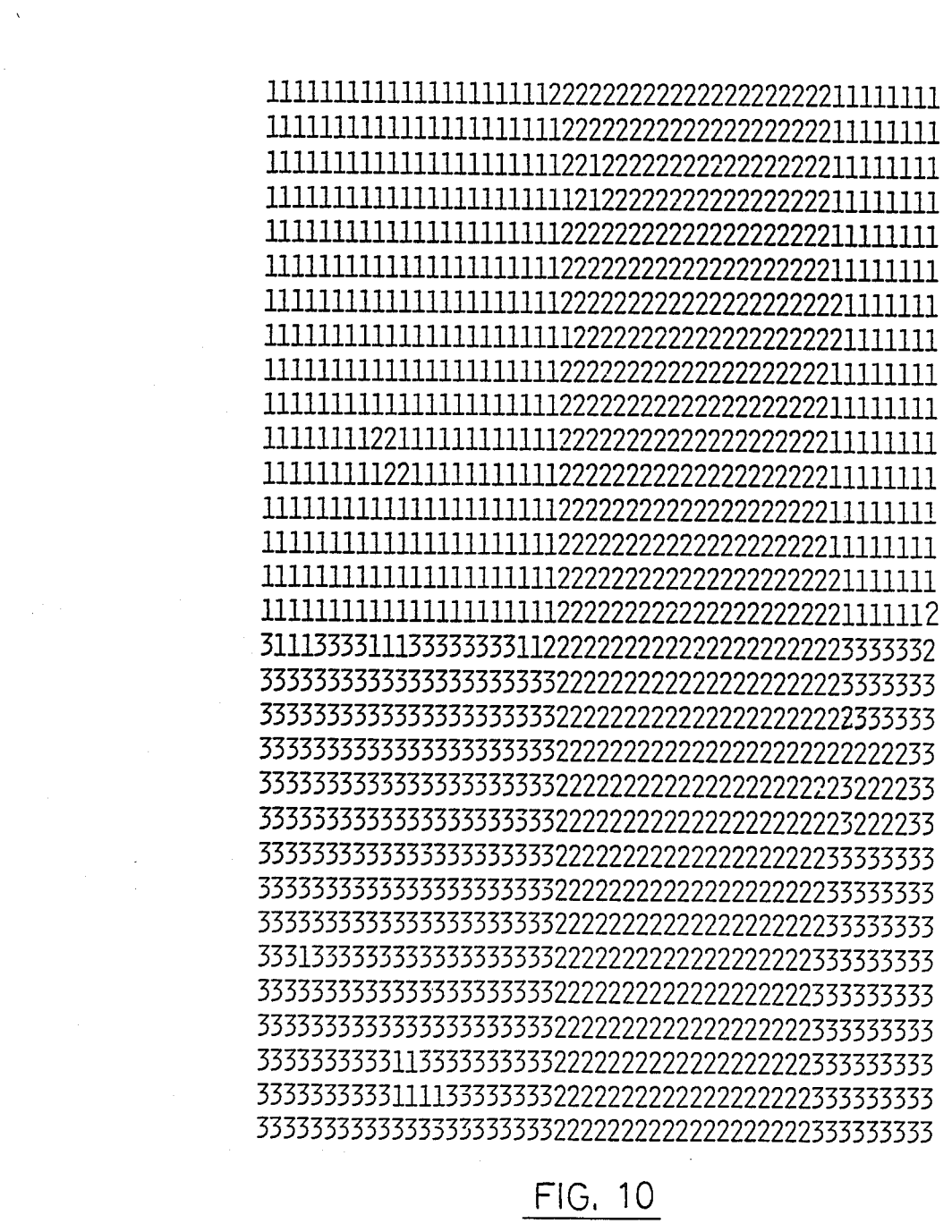

FIG. 10 shows the image after dilation process. The image consists of only pixels dominant in the window, so that main noise is removed.

(3) Minimum area filtering (step 300)

This is executed for the image from which main noise has already been removed by the majority logic filtering.

Figure 11:
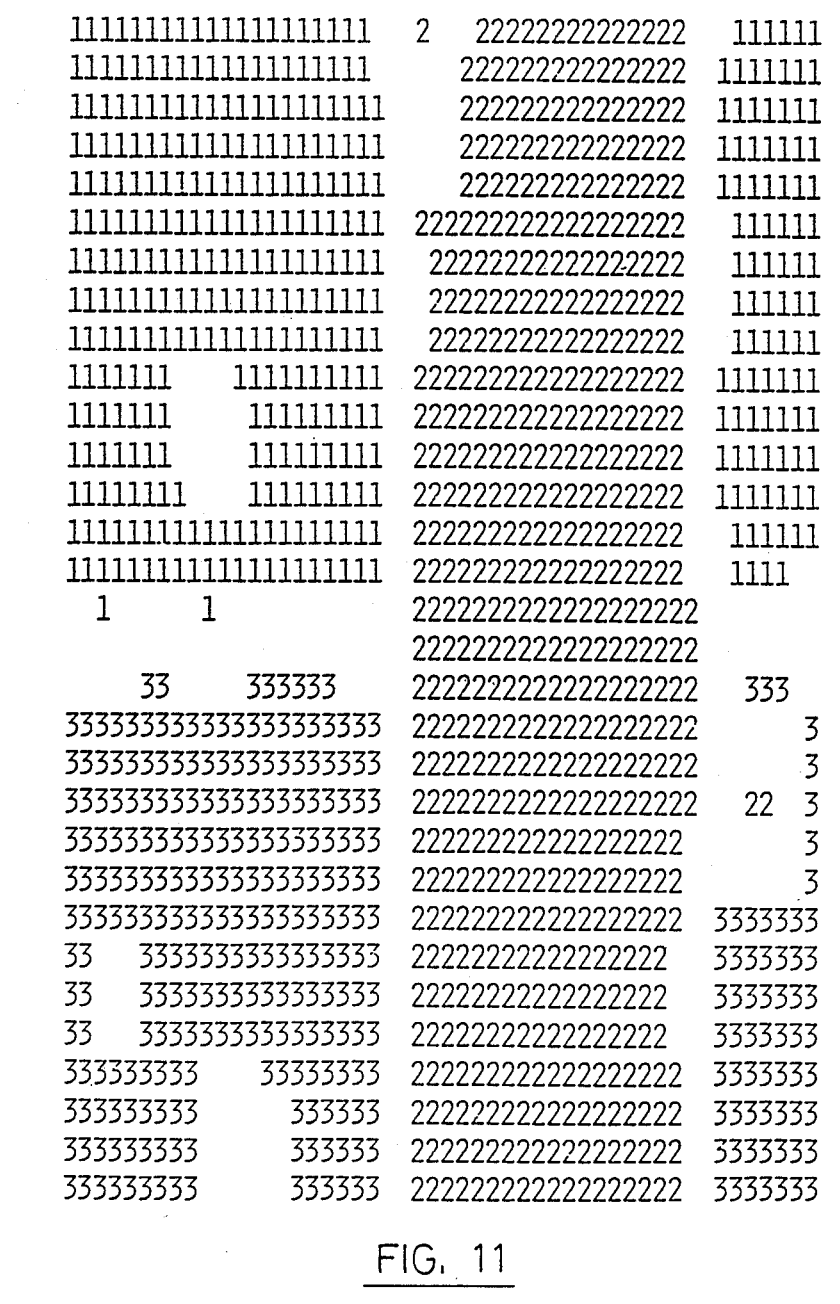

The image is processed by the erosion filter 7 at the size established in step 100. However, the threshold is automatically set at 100%. This process provides an image shown in FIG. 11.

Then, the image is processed by the dilation filter 8 at the size of window established in step 100. This provides an image, for example, as shown in FIG. 12.

In this process, the same pixel value regions smaller than the size of window are made null by the erosion filter 7, and then replaced with the pixel value of the neighborhood by the dilation filter 8. That is, the same pixel value regions smaller than the size of the window are not true objects in the image. They are false objects caused by noise. The process can eliminate such false objects from the image.

Figure 12:
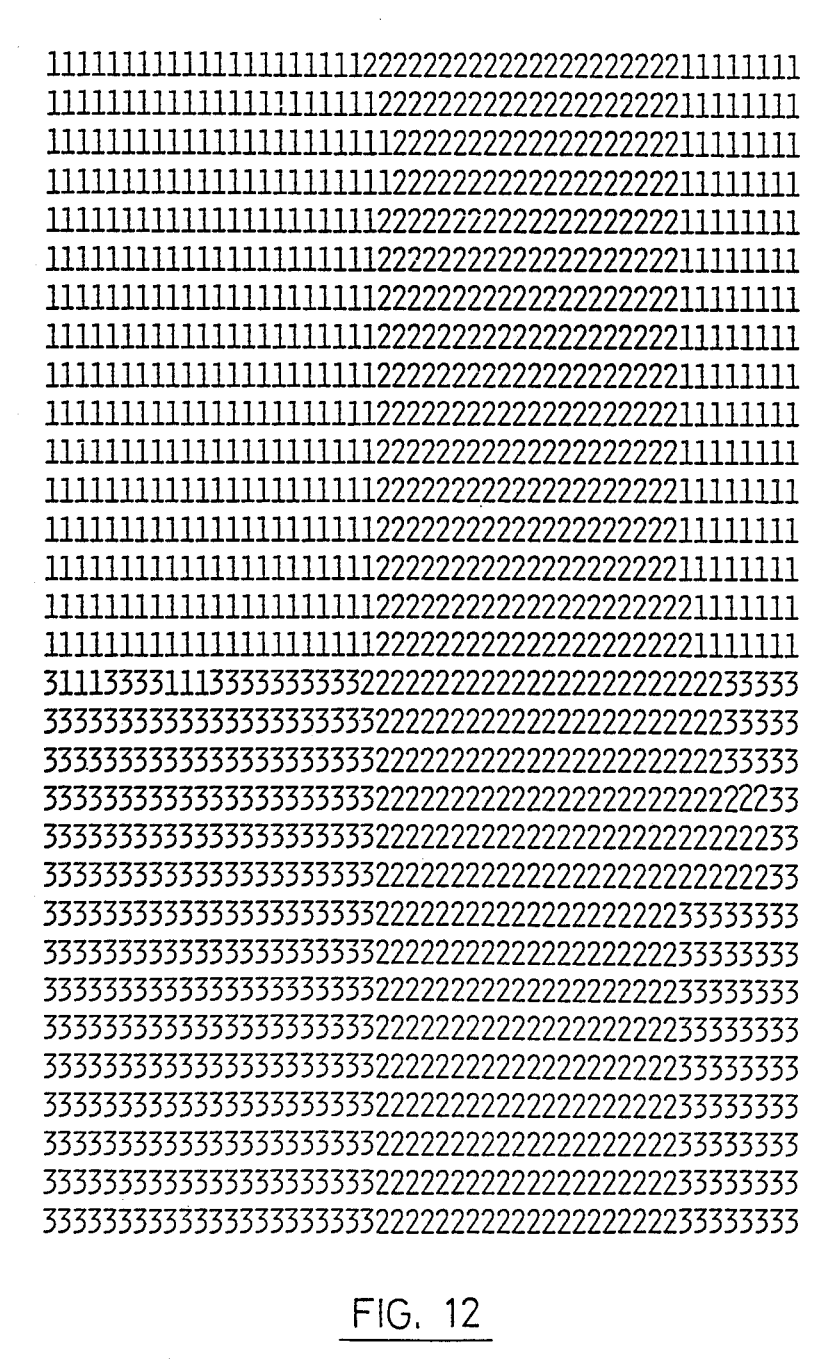

The image of FIG. 12 is the image restored by a series of operations, and is substantially the same as the original image before the addition of noise (FIG. 7).

Figure 14:
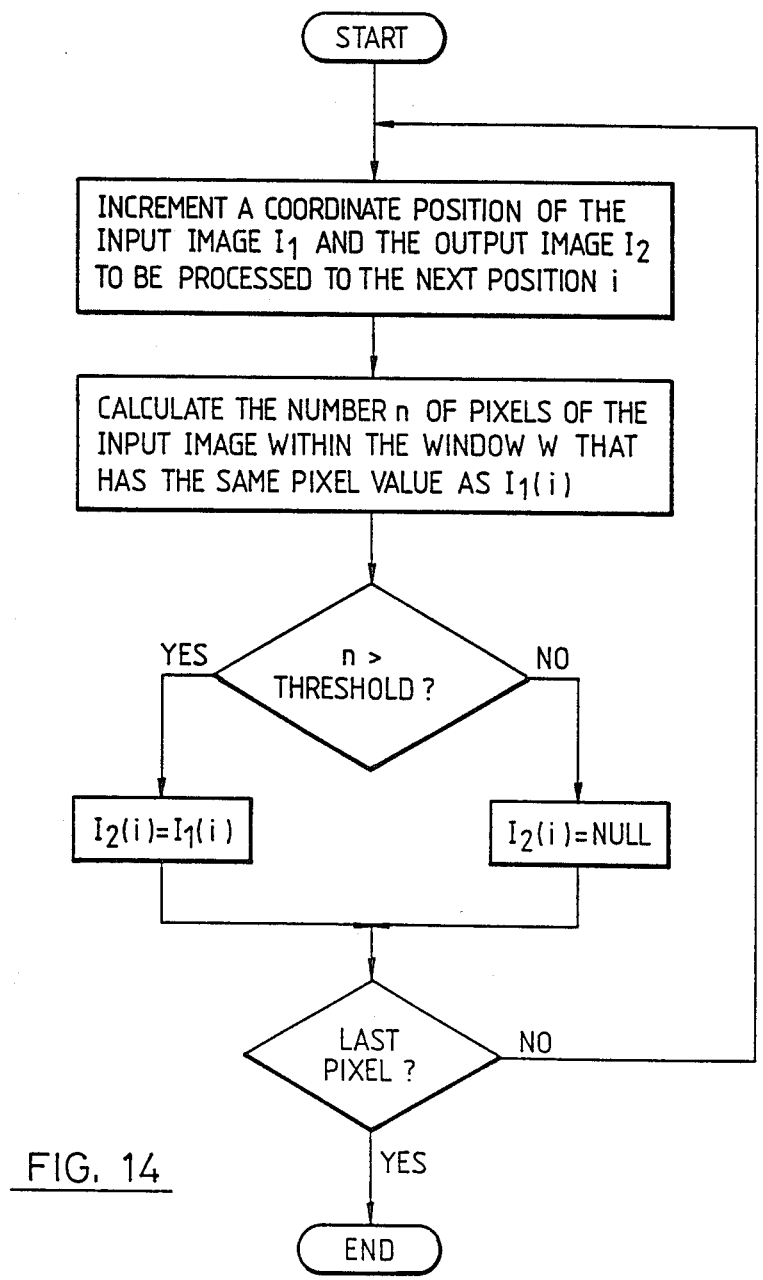
FIGS. 14 and 15 are flowcharts showing alternative embodiments of the invention.
Figure 15:
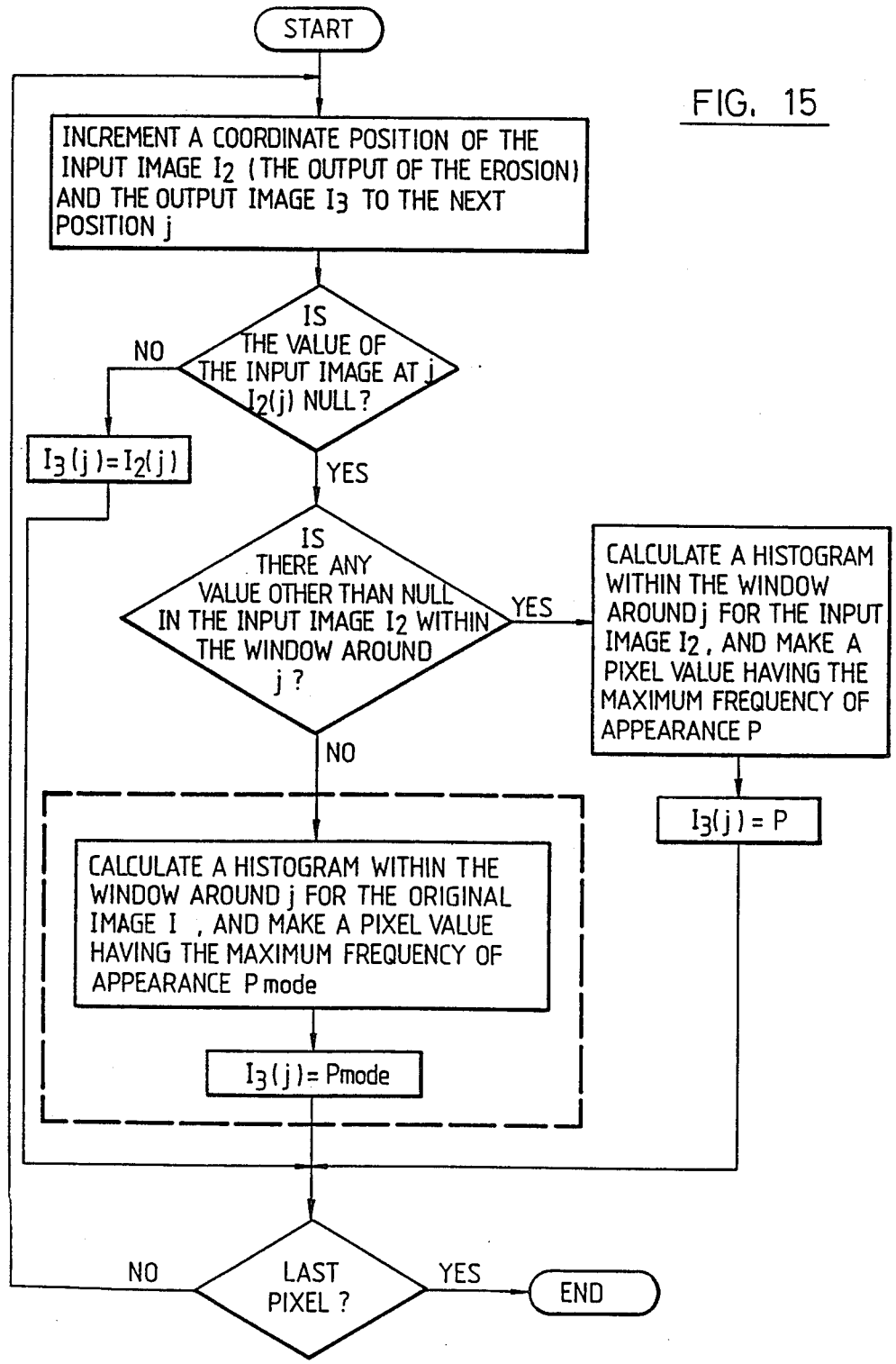

Although, in the above embodiment, the noise reduction/restoration unit 5 is implemented in hardware, it may of course, also be implemented in software. For example, FIG. 14 and 15 show a software implementation of the major portions of noise reduction/restoration unit 5 on IBM 3081K processor under the operating system VM/CMS using VS FORTRAN language. FIG. 14 shows the erosion process of an image, while FIG. 15 shows the dilation process of the image. The area enclosed by dotted line is a supplemental procedure for saving calculation. In principle, it may however be arranged to repeat the scanning until there is no null value.

The process procedure shown by FIG. 14 or 15 is clear from the figure, and no particular description is needed.

The invention enables restoration of an image by a local process without repetitive calculation. Furthermore the local process is based on a noise model that is very common in the field of process for restoring the image (the noise model that is the premise here is a model simply assuming that the correct output is more than incorrect one). This enables the removal of notch or blurr on a binary image that is presently mainstream.

Also, the degree of interest can be arranged for each of different pixel values of a multi-valued image having discrete values, by two parameters, so that spatial resolution for such an image can be freely varied.

In application to the field of mapping, a conventional techniques have not come to practical use, because they are far from existing regulations, but the use of the technique according to the present invention enables the automatic generalization of a map from satellite images, or a map of small scale from one of large scale.

Having thus described my invention, what I claim as new and desire to secure by Letters Patent is:

1. An apparatus for processing a multi-valued image having a plurality of pixels, each of said pixels having display characteristics and one pixel value selected from among a plurality of different pixel values, said pixel values corresponding to said display characteristics of said pixel, comprising:

erosion filter means for scanning said multi-valued image, with a first window, and for determining the frequency of appearance in said first window of pixels having a same pixel value as a pixel at a first check position of said first check position with a null pixel value when said frequency is equal to or less than a threshold value predetermined for said pixel value of said first check position, said null value not corresponding to a displayable pixel characeric and no being selected from said pixel values; and dilation filter means for scanning a multi-valued image, with a second window, and for, during said scanning, replacing said null pixel value at a second check position of said second window with a selected non-null pixel value in said second window, said selected non-null pixel value being selected to have a maximum frequency of appearance in said second window.

2. A method for processing a multi-valued image each of said pixels having display characteristics and one pixel value selected from among a plurality of different pixel values, said pixel values corresponding to said display characteristics of said pixels in which each object contained in said multi-valued image includes at least a structure element of a minimum unit, and pixels within a structure element of said minimum unit have the same pixel value unless said image is added with noise, said method comprising the steps of:

first erosion filter scanning of said multi-valued image with an erosion filter window consisting of a structure element of a predetermined minimum unit, and determining a frequency with which a pixel having a same pixel value as a pixel at a first check position of said erosion filter window appears in said erosion filter window, and replacing said pixel value at said first check position with a null pixel value when said frequency is equal to or less than a threshold value predetermined for a pixel value of said first check position, said threshold value being predetermined to be less than 100% of the number of all pixels in said erosion filter window, said null value not corresponding to a displayable pixel characteric and not being selected from said pixel values;

first dilation filter scanning said first erosion filter scanned multi-valued image, with a first dilation filter window, selecting a non-null pixel value to have a maximum frequency of appearance in said first dilation filter window and replacing said null pixel value at a second check position of said first dilation filter window with said selected non-null pixel value in said second window;

said dilation filter scanning step being repeated until all null pixels are substantially eliminated from said multi-valued image processed in said first erosion filter scanning step;

second erosion filter scanning said multi-valued image processed in said first dilation filter scanning step, with said erosion filter window, and determining a frequency with which a pixel having a same pixel value as a pixel at said first check position of said erosion filter window appears in said erosion filter window, and replacing said pixel value at said first check position with a null pixel value when said frequency is not equal to the number of all pixels in said erosion filter window;

second dilation filter scanning said multi-valued image processed in said second erosion filter scanning step, with a second dilation filter window, selecting a non-null pixel value having a maximum frequency of appearance in said second dilation filter window and replacing a null pixel value at a third check position of said second dilation filter window with a selected non-null pixel value; and, repeating said second dilation filter scanning step until all null pixels are substantially eliminated from said multi-valued image processed in said second erosion filter scanning step.

* * * * *